United States Patent
Long

[11] Patent Number: 6,105,091
[45] Date of Patent: Aug. 15, 2000

[54] CONNECTOR WITH INTEGRATED BUS AND POWER ISOLATION SWITCHES

[75] Inventor: G. Courtney Long, Chapel Hill, N.C.

[73] Assignee: International Business Machines Corporation, Armonk, N.Y.

[21] Appl. No.: 09/071,608

[22] Filed: May 1, 1998

[51] Int. Cl.[7] .................................................. G06F 13/00
[52] U.S. Cl. ........................... 710/103; 710/102; 361/748
[58] Field of Search .................... 710/101, 102, 710/103; 361/785, 748, 679; 439/55

[56] References Cited

U.S. PATENT DOCUMENTS

| | | |
|---|---|---|
| 5,148,354 | 9/1992 | Roth . |
| 5,272,584 | 12/1993 | Austruy et al. . |
| 5,277,591 | 1/1994 | Felcman et al. ........................... 439/60 |
| 5,283,707 | 2/1994 | Conners et al. . |
| 5,287,460 | 2/1994 | Olsen et al. ............................... 710/63 |
| 5,317,697 | 5/1994 | Husak et al. . |
| 5,384,492 | 1/1995 | Carlson et al. ........................... 307/147 |
| 5,432,916 | 7/1995 | Hahn et al. .............................. 361/791 |
| 5,530,302 | 6/1996 | Hamre et al. . |
| 5,568,610 | 10/1996 | Brown . |
| 5,572,395 | 11/1996 | Rasums et al. . |
| 5,584,030 | 12/1996 | Husak et al. . |
| 5,586,271 | 12/1996 | Parrett . |
| 5,604,873 | 2/1997 | Fite et al. . |
| 5,636,347 | 6/1997 | Muchnick et al. . |
| 5,644,470 | 7/1997 | Benedict et al. ......................... 361/686 |
| 5,644,730 | 7/1997 | Fayfield . |
| 5,671,368 | 9/1997 | Chan et al. . |
| 5,680,288 | 10/1997 | Carey et al. ............................. 361/118 |
| 5,712,754 | 1/1998 | Sides et al. ............................. 361/58 |
| 5,734,840 | 3/1998 | Chew et al. ............................. 710/102 |
| 5,754,796 | 5/1998 | Wang et al. ............................. 710/101 |

*Primary Examiner*—Xuan M. Thai
*Attorney, Agent, or Firm*—Felsman, Bradley, Vaden, Gunter & Dillon, LLP

[57] ABSTRACT

A hot-pluggable PCI adapter slot isolates the power from the adapter and the expansion slot signals from the system bus. MOSFETs with a gate drive controller are used to isolate power, and high speed FET switches isolate the signals. The wiring required to connect the bus to the bus switches and then to the adapter card is minimized by optimizing package size, pin count and trace lengths required for connection. The FET switches are embedded in the expansion PCI connector in series with the signal pins to the system PCB and the edge that connects the network to the finger on the adapter card.

9 Claims, 2 Drawing Sheets

CONNECTOR WITH INTEGRATED BUS AND POWER ISOLATION SWITCHES

TECHNICAL FIELD

This invention relates in general to hot-pluggable connectors and in particular to a hot-pluggable connector with integrated bus isolation switches.

BACKGROUND ART

The concept of hot-plugging electrical equipment refers to the ability to insert or remove equipment relative to a base unit without having to turn the system power off or reboot the system. Hot-plugging has its roots in the telephone switch room and is fairly well established. However, hot-plugging is relatively new to the personal computer equipment domain. One of the first systems to support hot-plug peripheral component interconnect (PCI) adapters in a server isolated the entire bus at the bus bridge controller and could resolve to the bus level. A subsequent system improved on this concept to support slot-wise granularity. The user could insert or remove single adapters while maintaining other operations on the same or peer PCI bus.

There are several problems with these designs. The PCI bus specification describes certain electrical signaling characteristics which must be met in order for the bus to function properly. One such parameter is associated with the trace or wire length of the bus signals. It is important to maintain consistency among the lengths of certain groups of bus signals to control the arrival time of the signals. Another problem concerns the package size and pin count. The best package size and pin count would be a single pin package that was no larger than the trace width. Unfortunately, traces are much narrower than any package would allow, and assembly would not be facilitated by such a package even if it existed.

One solution for hot-pluggable PCI adapter cards would utilize a field effect transistor (FET) in series with the PCI signal. FETs are typically available in surface mount packaging with a 10 or 20-bit width. Unfortunately, using this type of packaging increases the wiring length required to connect the FET to the PCI connector and the system bus. Although single-bit FETs are available, the aggregate space consumed by single-bit packages consumes too much space on the system board. Furthermore, adding the FET packages in close proximity to the PCI connector causes difficulty in manufacturing and rework of the system board.

DISCLOSURE OF THE INVENTION

A hot-pluggable PCI adapter slot isolates the power from the adapter and the expansion slot signals from the system bus. MOSFETs with a gate drive controller are used to isolate power, and high speed FET switches isolate the signals. The signals are routed through the FET switches for the purpose of isolation. The wiring required to connect the bus to the bus switches and then to the adapter card is minimized by optimizing package size, pin count and trace required for connection. The FETs are embedded in the expansion adapter connector in series with the connector pins to the system PCB and the edge that connects the network to the finger on the adapter card.

BEST MODE FOR CARRYING OUT THE INVENTION

Figure 1:
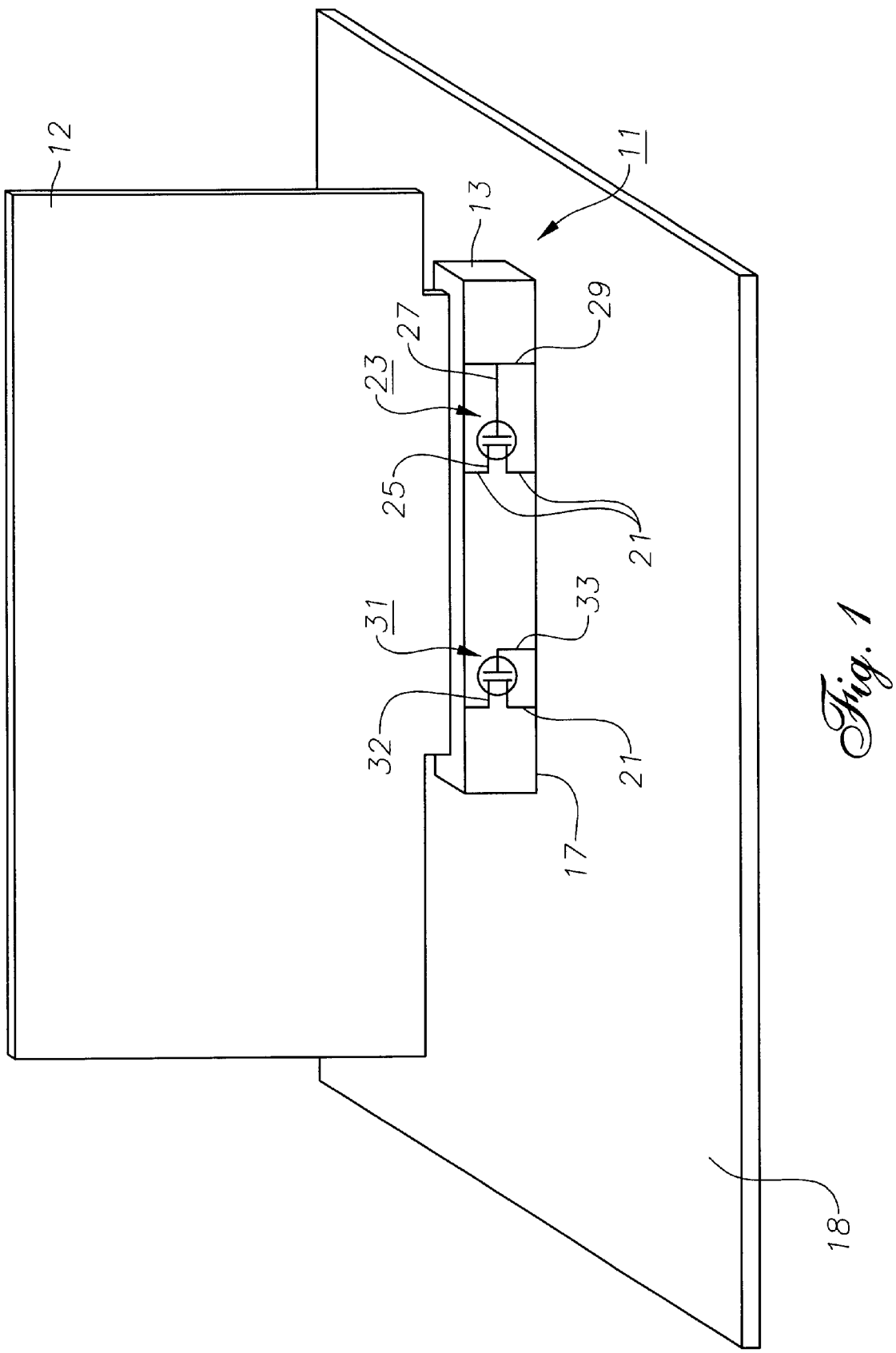
FIG. 1 is schematic drawing of a PCI adapter card, PCI connector and system board constructed in accordance with the invention.
Figure 2:
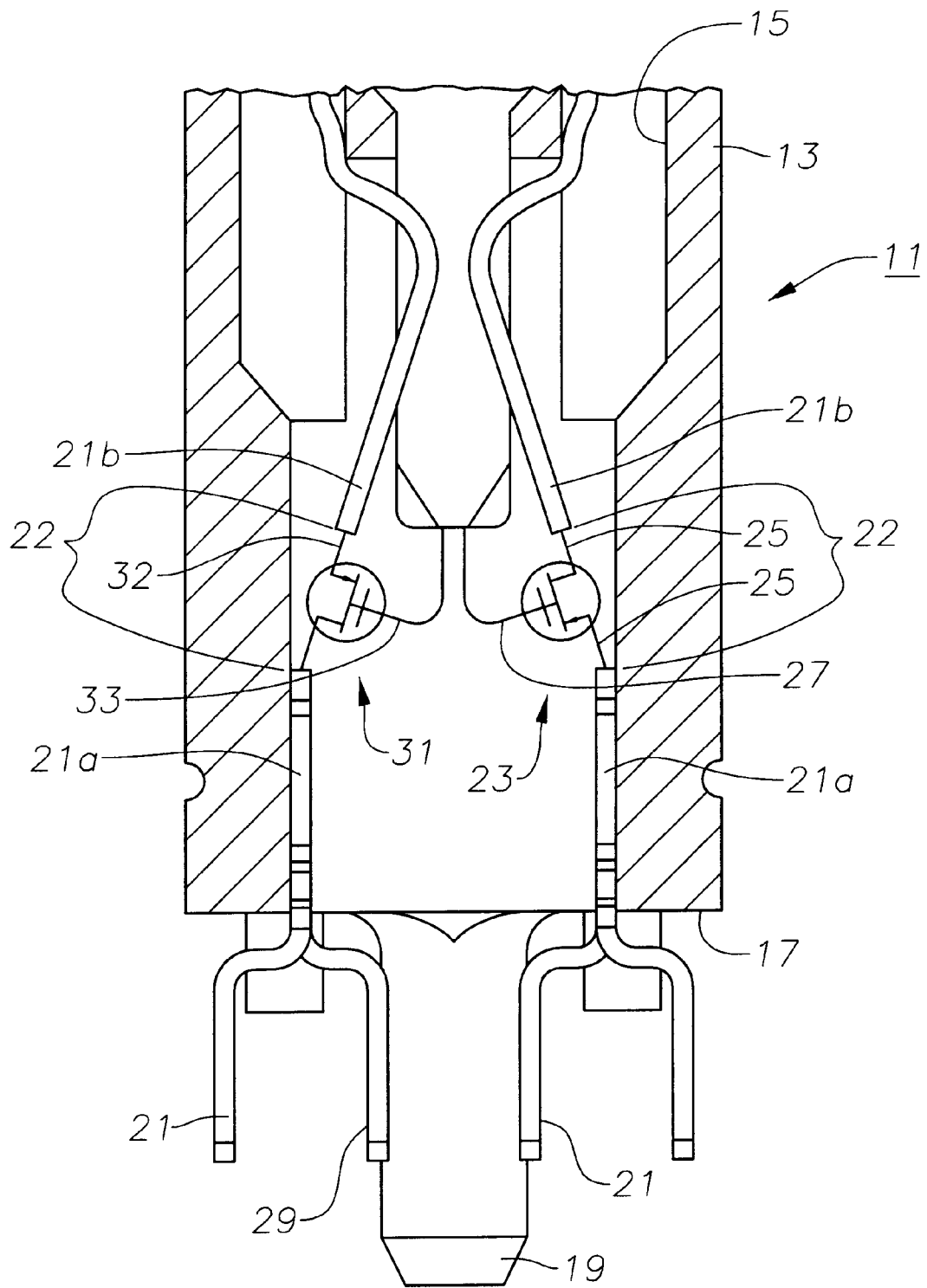
FIG. 2 is a sectional side view of a lower end of the PCI connector of FIG. 1 prior to installation in the system board.

Referring to FIG. 1, a hot-pluggable peripheral component interconnect (PCI) connector 11 for a PCI adapter card 12 is shown. As shown in FIG. 2, PCI connector 11 comprises a molded outer connector body 13 having an internal cavity 15 (FIG. 2) and a forward edge 17. An enlarged central locating member 19 is integrally formed with and extends forward from forward edge 17 to assist in properly locating PCI connector 11 in a PCI expansion slot (not shown) on a system printed circuit board (PCB) 18.

Referring again to FIG. 2, a plurality of metallic signal pins 21 extend through internal cavity 15 from a rearward end of connector body 13. Signal pins 21 are symmetrically arrayed within cavity 15 and protrude forward from forward edge 17 for connection with system board 18. Each pin 21 comprises a forward portion 21a and a rearward portion 21b separated by a gap 22. Gaps 22 are uniform in distance for each pin 21. A high-speed field effect transistor (FET) switch 23 (only one shown) is connected in series with each signal pin 21 at its gap 22. FET switch 23 may be integrated into signal pin 21 as a semiconductor process. Each FET switch 23 has a pair of leads 25 (source and drain) which are connected in-line with signal pin portions 21a, 21b. Each FET switch 23 also has a control gate 27 which is the electronic gate for controlling the flow of signals through FET switch 23. The control gates 27 are collectively connected to a separate control connector pin 29 which is identical to signal pins 21. Pin 29 connects to a voltage source in the system board 18 when PCI adapter card 12 is plugged in. Control gates 27 close in response to control connector pin 29 safely completing the circuit with PCI card 12. Control gates 27 close FET switches 23 when PCI adapter card 12 is unplugged. Preferably, signal pins 21, control connector pin 29 and FET switches 23 are molded within connector body 13. With FET switches 23 installed in series with signal pins 21, each signal pin 21 has the same length, including the path through each FET switch 23.

A MOSFET 31 with a pair of leads 32 and a gate drive controller 33 is attached in the gap 22 of one of pins 21 which is used to supply power to PCI card 12. MOSFET 31 may be used to isolate and control the flow of power through PCI connector 11 just as FET switches 23 control data signals. Like control gates 27, gate drive controller 33 is connected to control connector pin 29 for simultaneous actuation. Each MOSFET 31 is also connected into a gap 22 provided in the power pin 21.

In operation, PCI card 12 may be hot-plugged into a PCI connector 11 without shutting down or rebooting the system. Prior to installation of PCI card 12, control gates 27 and gate drive controller 33 are closed so that FET switches 23 and MOSFET 31 are off and do not permit the flow of signals or power through PCI connector 11. When pins 21, 29 of PCI connector 11 contact leads on PCI card 12, gates 27 and 33 open and permit signals and power flow through FET switches 23 and MOSFET 31, respectively, without damage to the components or system. Similarly, when PCI card 12 is unplugged, control gates 27 and 33 close to turn off FET switches 23 and MOSFET 31, respectively, to protect the system.

The invention has several advantages. By locating the FET switches in the connector, this solution solves the wiring length problem encountered in previous designs while saving board space on the host system unit. The use of integrated FET packages is less expensive than discrete components and reduces difficulties associated with the manufacturing and rework of the system board.

While the invention has been shown or described in only some of its forms, it should be apparent to those skilled in the art that it is not so limited, but is susceptible to various changes without departing from the scope of the invention.

I claim:

1. A hot-pluggable PCI connector on a system board for a PCI adapter card, comprising:

a molded outer connector body having an internal cavity and a forward edge;

a locating member integrally formed with and extending forward from the forward edge of the connector body;

a plurality of signal pins extending through the internal cavity and protruding forward from the forward edge of the connector body and adapted to be connected to the system board and the PCI card; and a high-speed FET switch connected in series with each of the signal pins and molded within the connector body such that each of the signal pins has the same length.

2. The PCI connector of claim 1 wherein power to the PCI connector is supplied through a separate power pin; and wherein the PCI connector further comprises:

a MOSFET switch connected in series with the power pin and located within the connector body.

3. The PCI connector of claim 1 wherein each of the signal pins has a rearward portion and a forward portion separated by a gap;

each of the FET switches is located in the gap and has a source lead connected to one of the portions and a drain lead connected to the other of the portions.

4. The PCI connector of claim 3 wherein all of the gaps are of the same dimension.

5. The PCI connector of claim 1, further comprising:

a gate controller pin which protrudes forward from the forward edge of the connector body and is adapted to be connected to the system board for supplying a control voltage; and wherein each FET switch has a gate connected to the gate controller pin for opening the FET switch when the gate controller pin engages the system board.

6. A computer, comprising:

a system board;

a PCI adapter card;

a molded outer connector body mounted to the PCI adapter card and having an internal cavity and a forward edge;

a locating member integrally formed with and extending forward from the forward edge of the connector body;

a plurality of signal pins extending through the internal cavity and protruding forward from the forward edge of the connector body and connected to the system board and the PCI adapter card, each of the signal pins having a rearward portion and a forward portion separated by a gap;

a high-speed FET switch located in each of the gaps and having a source lead connected to one of the portions and a drain lead connected to the other of the portions, the FET switches being molded within the connector body such that each of the signal pins has the same length;

a gate controller pin protruding forward from the forward edge of the connector body and connected to the system board for supplying a control voltage; and wherein each FET switch has a gate connected to the gate controller pin for opening the FET switch when the gate controller pin engages the system board; and wherein all of the gaps have the same dimension.

7. The computer of claim 6 wherein power to the PCI connector is supplied through a separate power pin; and wherein the PCI connector further comprises:

a MOSFET switch connected in series with the power pin and located within the connector body.

8. The computer of claim 7 wherein the power pin has a rearward portion and a forward portion separated by a gap; and wherein the MOSFET switch is located in the gap of the power pin and has a source lead connected to one of the portions of the power pin and a drain lead connected to the other of the portions of the power pin.

9. A PCI adapter card for a system board, comprising:

a molded outer connector body mounted to the PCI adapter card and having an internal cavity and a forward edge;

a locating member integrally formed with and extending forward from the forward edge of the connector body;

a plurality of signal pins extending through the internal cavity and protruding forward from the forward edge of the connector body and adapted to be connected to the system board, each of the signal pins having a rearward portion and a forward portion separated by a gap;

a high-speed FET switch located in each of the gaps and having a source lead connected to one of the portions and a drain lead connected to the other of the portions, the FET switches being molded within the connector body such that each of the signal pins has the same length;

a gate controller pin protruding forward from the forward edge of the connector body and adapted to be connected to the system board for supplying a control voltage;

a power pin for supplying power to the PCI connector, the power pin having a rearward portion and a forward portion separated by a gap;

a MOSFET switch located in the gap of the power pin within the connector body and having a source lead connected to one of the portions of the power pin and a drain lead connected to the other of the portions of the power pin; and wherein each FET switch has a gate connected to the gate controller pin for opening the FET switch when the gate controller pin engages the system board; and wherein all of the gaps of the signal pins have the same dimension.

* * * * *